United States Patent
Nakayama et al.

(10) Patent No.: US 11,885,375 B2
(45) Date of Patent: Jan. 30, 2024

(54) TUBULAR BODY USED FOR POWER TRANSMISSION SHAFT AND POWER TRANSMISSION SHAFT

(71) Applicant: Hitachi Astemo, Ltd., Ibaraki (JP)

(72) Inventors: Takahiro Nakayama, Ibaraki (JP); Kazuki Ohta, Ibaraki (JP); Kenichi Mori, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 341 days.

(21) Appl. No.: 17/194,991

(22) Filed: Mar. 8, 2021

(65) Prior Publication Data

US 2021/0190132 A1 Jun. 24, 2021

Related U.S. Application Data

(63) Continuation of application No. PCT/JP2019/010061, filed on Mar. 12, 2019.

(30) Foreign Application Priority Data

Feb. 27, 2019 (JP) ................. 2019-033922

(51) Int. Cl.
*F16C 3/02* (2006.01)
(52) U.S. Cl.
CPC .................. *F16C 3/026* (2013.01)
(58) Field of Classification Search
CPC ...................................... F16C 3/026
(Continued)

(56) References Cited

U.S. PATENT DOCUMENTS 3,470,761 A * 10/1969 Kenjiro ................. B62D 1/192
  280/777
3,482,466 A * 12/1969 Orlich ................... B62D 1/192
  280/777

(Continued)

FOREIGN PATENT DOCUMENTS

JP  H07-167211 A  7/1995
JP  H07-208445 A  8/1995

(Continued)

OTHER PUBLICATIONS

International Search Report and Written Opinion of the International Search Report for PCT/JP2019/010061 dated May 7, 2019.

(Continued)

*Primary Examiner* — Greg Binda
(74) *Attorney, Agent, or Firm* — KENEALY VAIDYA LLP (57) ABSTRACT

A tubular body of a power transmission shaft made of fiber-reinforced plastic is provided with a cylindrical main body portion, and a second connection portion continuous with an end portion of the main body portion and to which a stab shaft is joined. The main body portion is formed with a weak portion which fails when a load input in the direction of an axial line exceeds a predetermined value. A linear rupture portion is formed on an outer peripheral surface of the weak portion. In the present configuration, cost reduction and weight reduction of the tubular body are made possible, and the tubular body fails infallibly when a predetermined load is input to the tubular body in the direction of the axial line.

7 Claims, 6 Drawing Sheets (58) Field of Classification Search
USPC .................................. 464/181, 183; 280/777
See application file for complete search history.

(56) References Cited

U.S. PATENT DOCUMENTS

| | | | |
|---|---|---|---|
| 4,531,619 A * | 7/1985 | Eckels | F16F 7/123 |
| | | | 280/777 |
| 5,836,825 A | 11/1998 | Yamane | |
| 6,190,263 B1 | 2/2001 | Kimoto et al. | |
| 6,896,290 B2 * | 5/2005 | Lutz | B21C 37/154 |
| | | | 280/777 |
| 2005/0150709 A1 | 7/2005 | Tapazoglou et al. | |
| 2014/0128168 A1 | 5/2014 | Laskey et al. | |

FOREIGN PATENT DOCUMENTS

| | | |
|---|---|---|
| JP | H07-309146 A | 11/1995 |
| JP | H09-175202 A | 7/1997 |
| JP | H11-78563 A | 3/1999 |
| JP | 2016-502478 A | 1/2016 |
| WO | 2020/174701 A1 | 9/2020 |

OTHER PUBLICATIONS

Japanese Office Action (Notice of Reasons for Refusal) for the related Japanese Patent Application No. 2019-033922 dated Apr. 15, 2019.

* cited by examiner

TUBULAR BODY USED FOR POWER TRANSMISSION SHAFT AND POWER TRANSMISSION SHAFT

CROSS-REFERENCE TO RELATED APPLICATION

This application is a PCT Bypass Continuation application of and claims the priority benefit under 35 U.S.C. § 120 to PCT application No. PCT/JP2019/010061, filed on Mar. 12, 2019 and therefore also claims the priority benefit under 35 U.S.C. § 119 of Japanese Patent Application No. 2019-033922, filed on Feb. 27, 2019, the entire contents of each of PCT application No. PCT/JP2019/010061 and Japanese Patent Application No. 2019-033922 is incorporated herein by reference.

TECHNICAL FIELD

The present invention relates to a tubular body used in a power transmission shaft and to a power transmission shaft.

BACKGROUND ART

A power transmission shaft (propeller shaft) mounted in a vehicle extends in a front-rear direction of the vehicle and transmits power, generated in a motor and subjected to speed reduction in a transmission, to a final drive gear. As such a power transmission shaft, there is a shaft made of a fiber reinforced plastic.

As a tubular power transmission shaft made of a fiber reinforced plastic, there is a shaft which includes a main body portion, a connection portion having a larger diameter than the main body portion, and an inclined portion formed between the main body portion and the connection portion and in which a shaft portion of a universal joint is fitted into the connection portion (see, for example, Patent Literature 1).

In the aforementioned power transmission shaft, when a vehicle is hit from the front side and impact load exceeding a predetermined value is inputted into the power transmission shaft, the shaft portion slides relative to the connection portion and comes into contact with an inner surface of the inclined portion and the inclined portion thereby fails. This causes an engine and a transmission mounted in a front portion of a vehicle body to quickly retreat and the front portion of the vehicle body absorbs impact energy.

Moreover, as another configuration of the power transmission shaft, there is a configuration in which a peripheral wall portion of a connection portion is formed of multiple layers and, when impact load exceeding a predetermined value is inputted into the power transmission shaft, an inner layer portion of the connection portion peels off together with a shaft portion and the shaft portion retreats (see, for example, Patent Literature 2).

CITATION LIST

Patent Literature

Patent Literature 1: Japanese Patent Application Publication No. H09-175202

Patent Literature 2: Japanese Patent Application Publication No. H07-208445

SUMMARY OF INVENTION

Technical Problem

In the configuration in which the shaft portion slides relative to the connection portion only when the impact load exceeding the predetermined value is inputted out of the aforementioned conventional power transmission shafts, joining force between the connection portion and the shaft portion needs to be accurately set. To this end, the dimensions of the connection portion and the shaft portion need to be accurately molded and the diameter of the connection portion increases. This causes a problem of increases in manufacturing cost and weight.

Moreover, in the configuration in which the inner peripheral portion of the connection portion peels off together with the shaft portion in impact out of the aforementioned conventional power transmission shafts, the peripheral wall portion of the connection portion is formed of multiple layers and this causes a problem of an increase in manufacturing cost.

An object of the present invention is to solve the aforementioned problems and provide a power transmission shaft that can achieve low cost and weight reduction, and that surely fail when predetermined load is inputted in a direction of an axis.

Solution to Problem

A first aspect of the present invention for solving the aforementioned problems is a tubular body used in a power transmission shaft that transmits power by rotating and that is made of a fiber reinforced plastic. The tubular body includes a tubular main body portion that is centered at an axis and a connection portion which is continuous with an end portion of the main body portion and to which a coupling member is joined. A rupture portion that fails when load inputted in an axial direction exceeds a predetermined value is formed in the main body portion and a linear rupture portion is formed on the outer peripheral surface of the weak portion.

A second aspect of the present invention for solving the aforementioned problems is a power transmission shaft. The power transmission shaft includes a tubular body used in the power transmission shaft and the coupling member joined to the connection portion.

Advantageous Effects of Invention

In the power transmission shaft including the tubular body used in the power transmission shaft of the present invention, when load is inputted in the axial direction and exceeds a predetermined value, the weak portion fails and the main body portion is partially crushed.

In this configuration, joining force between the connection portion and the coupling member does not have to be accurately set and the molding of the connection portion is facilitated. Moreover, the linear rupture portion is easily processed on the outer peripheral surface of the weak portion. Furthermore, the weak portion can be formed without increasing the size of the main body portion or providing other members in the main body portion.

Accordingly, the power transmission shaft of the present invention can achieve cost reduction and weight reduction.

Moreover, in the power transmission shaft of the present invention, a load value at which the weak portion fails can be set by adjusting the shape of the linear rupture portion.

DESCRIPTION OF EMBODIMENTS

Next, a tubular body and a power transmission shaft in each of embodiments are described with reference to the drawings. Note that, in each embodiment, description is given of an example in which the power transmission shaft of the present invention is applied to a propeller shaft mounted in a FF (front-engine, front-drive)-based four-wheel drive vehicle. Moreover, technical elements common among the embodiments are denoted by the same reference numerals and description thereof is omitted.

First Embodiment

Figure 1:
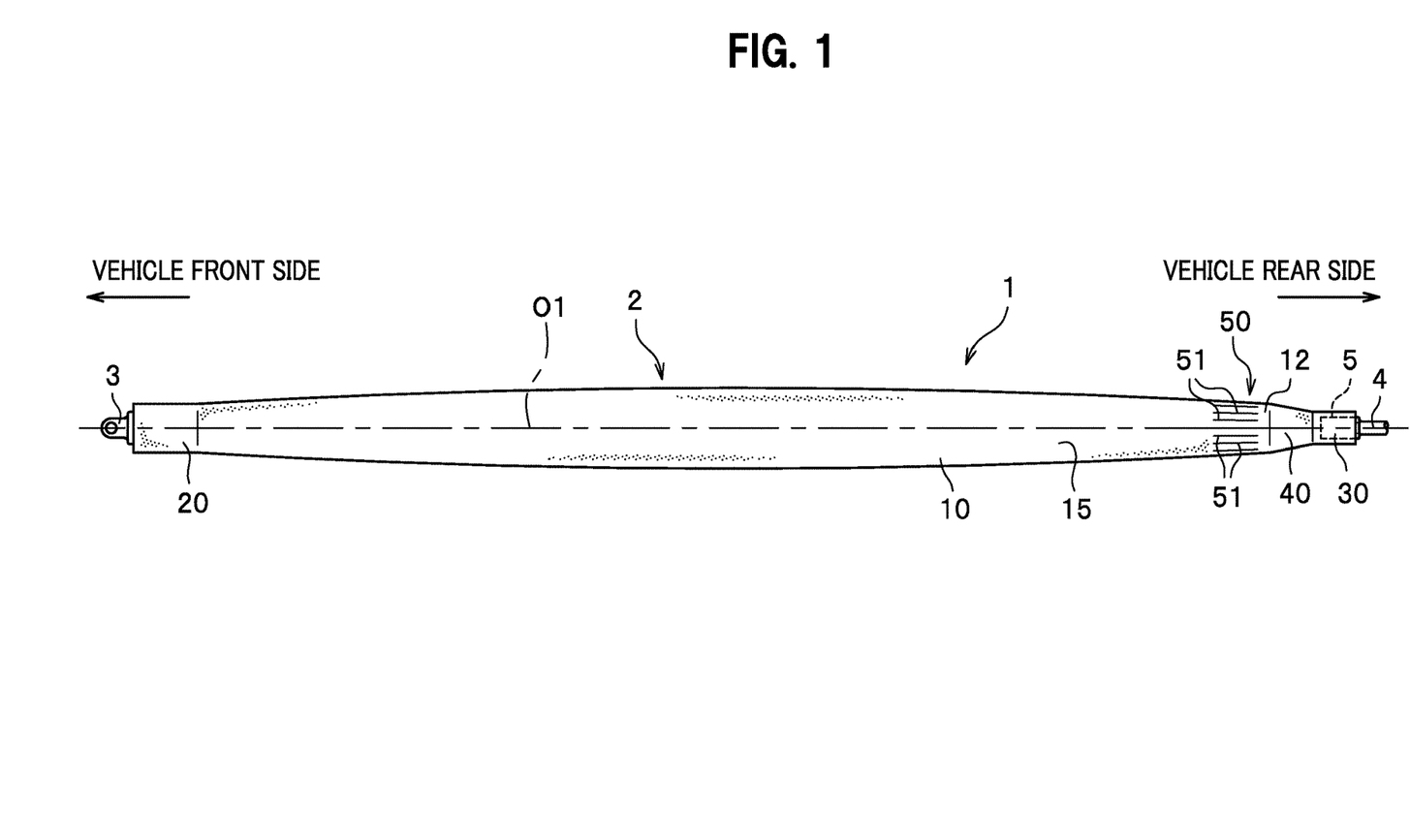
FIG. 1 is a side view illustrating a power transmission shaft of a first embodiment.

As illustrated in FIG. 1, a power transmission shaft 1 of a first embodiment includes a substantially-cylindrical tubular body 2 (pipe) that extends in a front-rear direction of the vehicle. Moreover, the power transmission shaft 1 includes a stub yoke 3 of a Cardan joint joined to a front end of the tubular body 2 and a stub shaft 4 ("coupling member" in the scope of claims) of a constant-velocity joint joined to a rear end of the tubular body 2.

The power transmission shaft 1 is coupled to a transmission, mounted in a front portion of a vehicle body, via the stub yoke 3 and is also coupled to a final drive gear, mounted in a rear portion of a vehicle body, via the stub shaft 4.

When power (torque) is transmitted from the transmission to the power transmission shaft 1, the power transmission shaft 1 rotates about an axis O1 and the power is transmitted to the final drive gear.

The tubular body 2 is made of a carbon fiber reinforced plastic (CFRP). Note that reinforcement fibers used in the fiber reinforced plastic of the present invention are not limited to carbon fibers and may be glass fibers or aramid fibers.

A method of manufacturing the tubular body 2 is such that a continuous carbon fiber is wound around a not-illustrated mandrel to form a molded body and then a pre-preg (sheet obtained by impregnating carbon fibers with a resin) is wound around an outer periphery of the molded body. Accordingly, the power transmission shaft 1 is manufactured by incorporating two crafting methods of the filament winding method and the sheet winding method.

In this case, the molded body manufactured by the filament winding method has high mechanical strength (particularly, torsional strength) because the continuity of the fiber (carbon fiber) is maintained.

Meanwhile, in the sheet winding method, the carbon fibers can be arranged to extend in an axial direction of the mandrel. Thus, the molded body with high elasticity in the axis O1 direction can be manufactured.

Specifically, in the aforementioned manufacturing method, a fiber layer made of a fiber wound about the axis O1 and a fiber layer made of fibers extending in the axis O1 direction are stacked one on top of the other in the tubular body 2 and the tubular body 2 with high mechanical strength and high elasticity in the axis O1 direction can be manufactured.

Note that a PAN (polyacrylonitrile) based fiber is preferable as the fiber aligned in a circumferential direction and pitch fibers are preferable as the fibers aligned in the axis O1 direction.

The method of manufacturing the tubular body 2 of the present invention is not limited to the manufacturing method described above. As a method of manufacturing the tubular body 2, it is possible to employ a method in which a pre-preg is wound around a mandrel to form a molded body and a continuous carbon fiber is wound around an outer periphery of the molded body. Alternatively, one type of manufacturing method (filament winding method or sheet winding method) may be used as the manufacturing method of the tubular body 2.

The tubular body 2 includes a tubular main body portion 10 having the axis O1 as a center axis, a first connection portion 20 arranged in front of the main body portion 10, and a second connection portion 30 arranged behind the main body portion 10. Moreover, in the power transmission shaft 1, a weak portion 50 is formed in the main body portion 10.

When the main body portion 10 is cut along a plane whose normal is the axis O1, a cross-sectional shape of an outer peripheral surface 15 of the main body portion 10 is a circular shape.

Moreover, the main body portion 10 decreases in outer diameter while extending from a center portion toward both end portions and the outer diameter in the center portion is larger than the outer diameters in both end portions.

Specifically, when the main body portion 10 is cut along the axis O1, the cross-sectional shape of the outer peripheral surface 15 of the main body portion 10 is an arc shape that forms gentle curves and protrudes outward. Thus, the outer shape of the main body portion 10 is a barrel shape having a center portion bulging outward in a radial direction.

Although the cross-sectional shape of the outer peripheral surface 15 of the main body portion 10 in the case where the main body portion 10 is cut along the axis O1 is the arc shape in the tubular body 2 of the first embodiment, the cross-sectional shape of the outer peripheral surface 15 of the main body portion 10 may be formed to be a step shape in the present invention.

Alternatively, the cross-sectional shape of the outer peripheral surface 15 of the main body portion 10 in the case where the main body portion 10 is cut along the axis O1 may be linearly inclined to come closer toward the center while extending from the center portion toward both end portions.

A shaft portion (not illustrated) of the stub yoke 3 is fitted into the first connection portion 20. An inner peripheral surface of the first connection portion 20 has a polygonal shape following a polygonal outer peripheral surface of the shaft portion of the stub yoke 3. The tubular body 2 and the stub yoke 3 are thus configured not to rotate relative to each other.

A shaft portion 5 of the stub shaft 4 is fitted into the second connection portion 30. An inner peripheral surface of the second connection portion 30 has a polygonal shape following a polygonal outer peripheral surface of the shaft portion 5 of the stub shaft 4. The tubular body 2 and the stub shaft 4 are thus configured not to rotate relative to each other.

A cylindrical inclined portion 40 is formed between the main body portion 10 and the second connection portion 30. The inclined portion 40 gradually decreases in outer diameter while extending from the main body portion 10 toward the second connection portion 30 and has a truncated cone shape.

The inclined portion 40 gradually decreases in wall thickness while extending from an end portion (rear end portion, one end portion) on the second connection portion 30 side (rear side) toward an end portion (front end portion, other end portion) on the main body portion 10 side (front side). Accordingly, the wall thickness is smallest in the front end portion of the inclined portion 40 and the front end portion of the inclined portion 40 forms the weak portion. The weak portion is a portion in which the shear strength of the inclined portion 40 is lowest.

Although the wall thickness varies over the entire inclined portion 40 in the tubular body 2, the wall thickness may vary in a partial section of the inclined portion 40.

Alternatively, the weak portion may be provided in the rear end portion of the inclined portion 40 by causing the inclined portion 40 to gradually decrease in wall thickness while extending from the end portion (front end portion, other end portion) on the main body portion 10 side (front side) toward the end portion (rear end portion, one end portion) on the second connection portion 30 side (rear side).

Figure 2:
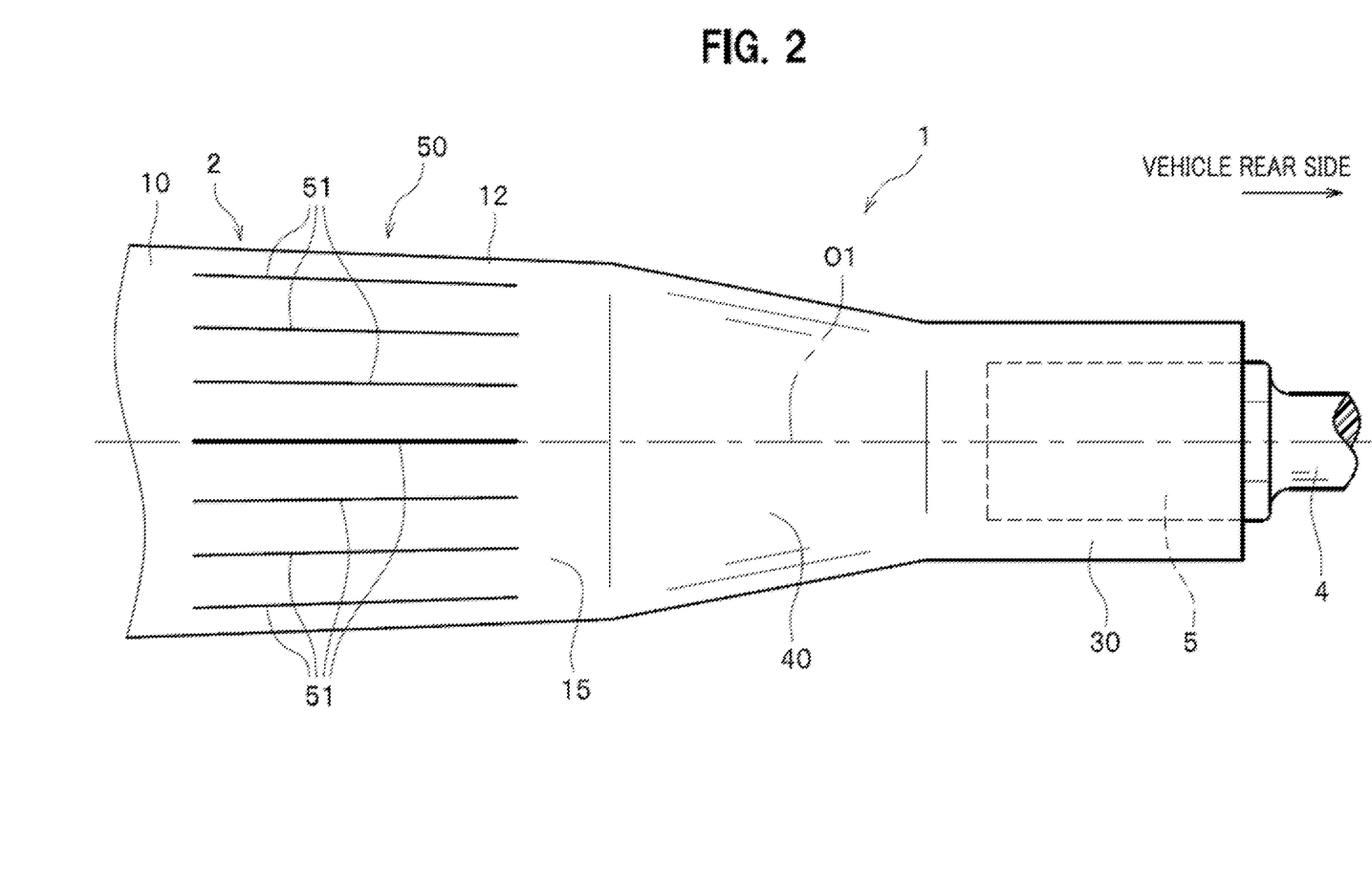
FIG. 2 is a side view illustrating a weak portion of the power transmission shaft in the first embodiment.

As illustrated in FIG. 2, the weak portion 50 is formed in a rear portion 12 of a main body portion 10.

Linear rupture portions 51 obtained by cutting into an outer peripheral surface 15 of the main body portion 10 are formed in the weak portion 50 of the first embodiment. The rupture portions 51 are cut lines linearly extending in the axis O1 direction (front-rear direction) of the main body portion 10.

Moreover, the linear rupture portions 51 do not penetrate a peripheral wall portion of the main body portion 10 and are configured such that water and dust do not enter the main body portion 10 from the rupture portions 51.

Multiple rupture portions 51 are formed at intervals in a circumferential direction of the outer peripheral surface 15 in the weak portion 50 of the first embodiment.

Forming multiple rupture portions 51 in the main body portion 10 as described above forms the weak portion 50 with lower strength than other portions of the main body portion 10.

Note that the number of rupture portions 51 is not limited to a certain number in the present invention and, for example, only one rupture portion 51 may be formed on the outer peripheral surface 15 of the weak portion 50.

Moreover, the length and width of the linear rupture portions 51 are not limited to certain length and width. Furthermore, the linear rupture portions 51 may be curved or bent with respect to the axis O1 direction. Moreover, multiple rupture portions 51 may be arranged in the axis O1 direction.

Figure 3:
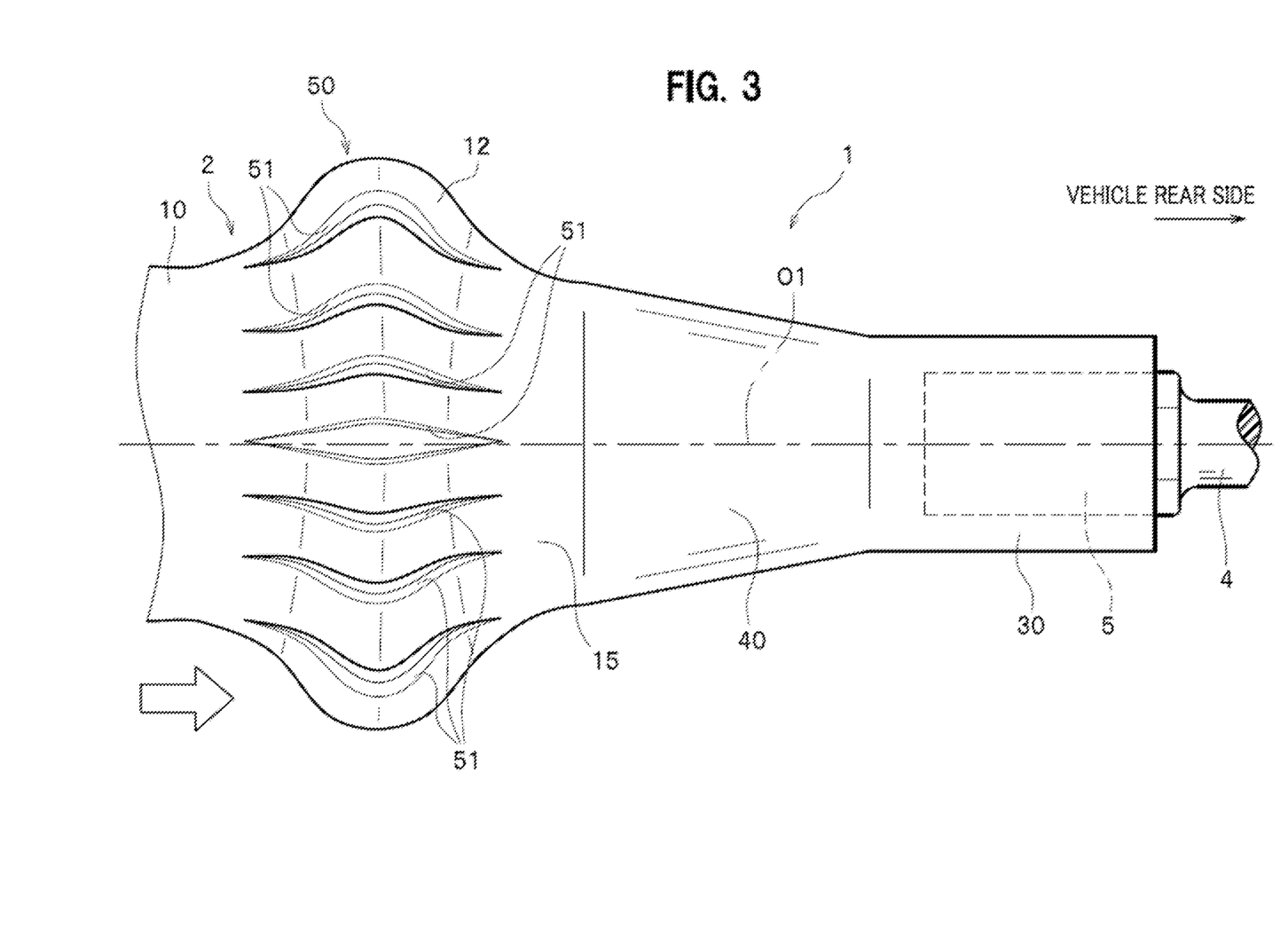
FIG. 3 is a side view illustrating a state where the weak portion is failed in the power transmission shaft of the first embodiment.

In the power transmission shaft 1 including the tubular body 2 of the first embodiment as described above, when the vehicle is hit from the front side and impact load inputted into the power transmission shaft 1 in the axis O1 direction exceeds a predetermined value, the rupture portions 51 are cut open in the circumferential direction and fail as illustrated in FIG. 3. The weak portion 50 (rear portion 12) of the main body portion 10 thereby bulges in the radial direction and is crushed. The failure of the power transmission shaft 1 in vehicle impact thus allows the engine and the transmission mounted in the front portion of the vehicle body to quickly retreat and the front portion of the vehicle body absorbs impact energy.

As described above, in the tubular body 2 and the power transmission shaft 1 of the first embodiment, as illustrated in FIG. 2, joining force between the second connection portion 30 and the stub shaft 3 does not have to be accurately set and the molding of the second connection portion 30 is facilitated. Moreover, the linear rupture portions 51 are easily processed on the outer peripheral surface 15 of the weak portion 50. Furthermore, the weak portion 50 can be formed without increasing the size of the main body portion 10 or providing other members in the main body portion 10.

Accordingly, the tubular body 2 and the power transmission shaft 1 of the first embodiment can achieve cost reduction and weight reduction. Moreover, in the tubular body 2 and the power transmission shaft 1 of the first embodiment, a load value at which the weak portion 50 fails can be set by adjusting the shape of the linear rupture portions 51.

Moreover, in the tubular body 2 and the power transmission shaft 1, since the center portion of the main body portion 10 where the bending stress tends to concentrate is formed to have a large outer diameter as illustrated in FIG. 1, the center portion has predetermined bending strength.

Furthermore, since the tubular body 2 and the power transmission shaft 1 are made of the fiber reinforced plastic, a degree of freedom in design is high and the cost can be further reduced.

Second Embodiment

Next, a power transmission shaft 101 including a tubular body 102 according to a second embodiment of the present invention is described.

Figure 4:
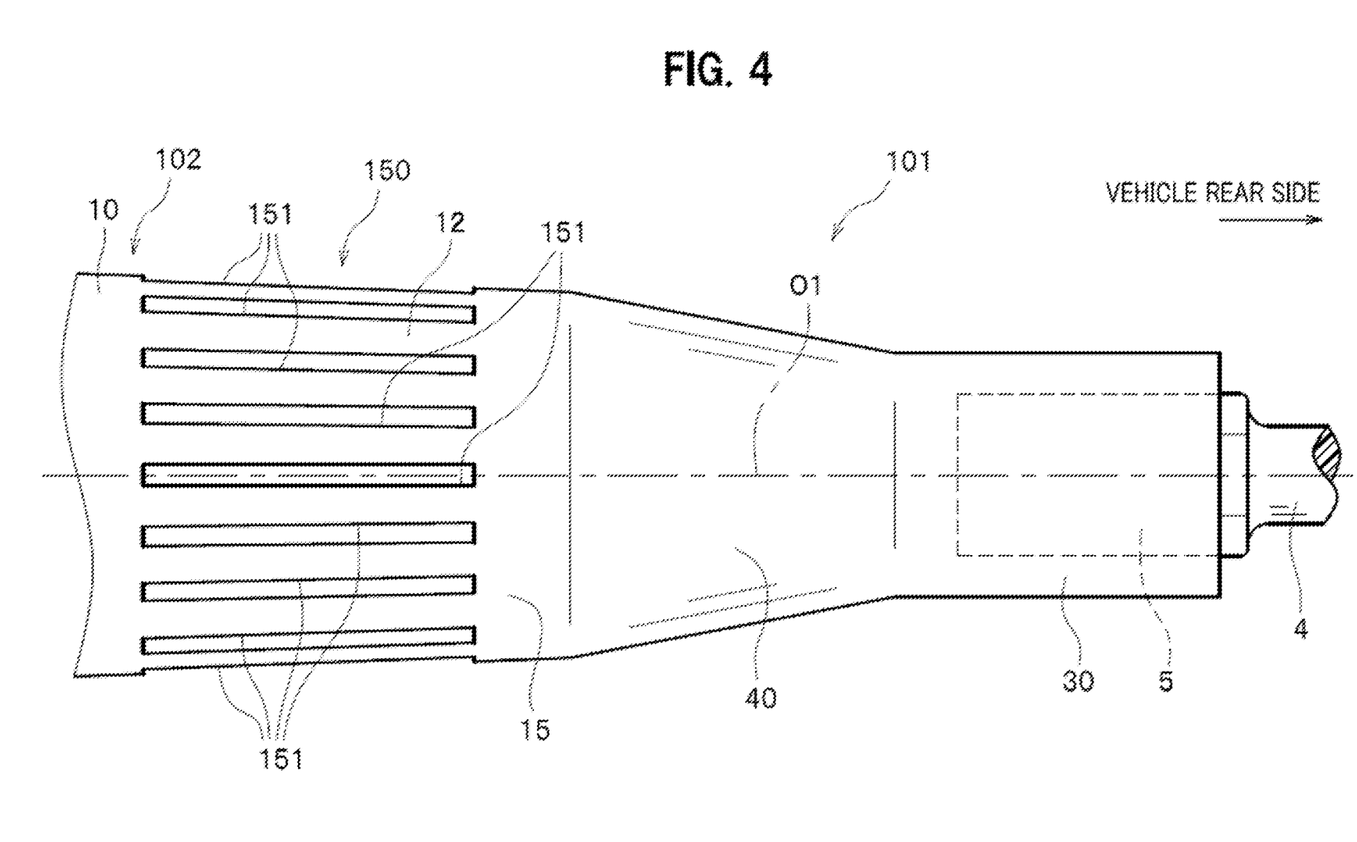
FIG. 4 is a side view illustrating a weak portion in a power transmission shaft of a second embodiment.

As illustrated in FIG. 4, the power transmission shaft 101 of the second embodiment includes the tubular body 102, the stub yoke 3 (see FIG. 1) joined to a front end of the tubular body 102, and the stub shaft 4 joined to a rear end of the tubular body 102.

The tubular body 102 of the second embodiment includes a main body portion 10, the first connection portion 20 (see FIG. 1) arranged in front of the main body portion 10, and the second connection portion 30 arranged behind the main body portion 10. Moreover, a weak portion 150 is formed in the main body portion 10.

Linear rupture portions 151 formed in the weak portion 150 of the second embodiment are grooves obtained by recessing the outer peripheral surface 15 of the main body portion 10. The rupture portions 151 linearly extend in the axis O1 direction (front-rear direction) of the main body portion 10.

When the rupture portions 151 of the second embodiment are cut along a plane whose normal is the axis O1, the cross-sectional shape of the rupture portions 151 is a quadrilateral shape. However, in the present invention, the cross-sectional shape of the rupture portions 151 is not limited to a certain shape and may be formed to be, for example, a semi-circular shape or a triangular shape.

In the weak portion 150 of the second embodiment, multiple rupture portions 151 are formed at intervals in the circumferential direction of the outer peripheral surface 15.

Note that the number, length, width, shape, and arrangement of the rupture portions 151 in the second embodiment are not limited to certain number, length, width, shape, and arrangement as in the power transmission shaft 1 (see FIG. 2) of the first embodiment.

In the power transmission shaft 101 using the tubular body 102 of the second embodiment as described above, when the vehicle is hit from the front side and impact load inputted in the axis O1 direction exceeds a predetermined value, the rupture portions 151 open in the circumferential direction and fail and the weak portion 150 of the main body portion 10 is crushed. The failure of the power transmission shaft 101 in vehicle impact thus allows the engine and the transmission mounted in the front portion of the vehicle body to quickly retreat and the front portion of the vehicle body absorbs impact energy.

As described above, in the tubular body 102 and the power transmission shaft 101 of the second embodiment, the molding of the second connection portion 30 and the main body portion 10 is facilitated as in the power transmission shaft 1 (see FIG. 2) of the first embodiment and, in addition, the linear rupture portions 151 are formed on the outer peripheral surface 15 of the weak portion 150. Accordingly, the tubular body 102 and the power transmission shaft 101 of the second embodiment can achieve cost reduction and weight reduction. Moreover, in the tubular body 102 and the power transmission shaft 101 of the second embodiment, a load value at which the weak portion 150 fails can be set by adjusting the shape of the linear rupture portions 151.

Third Embodiment

Next, a power transmission shaft 201 including a tubular body 202 according to a third embodiment of the present invention is described.

Figure 5:
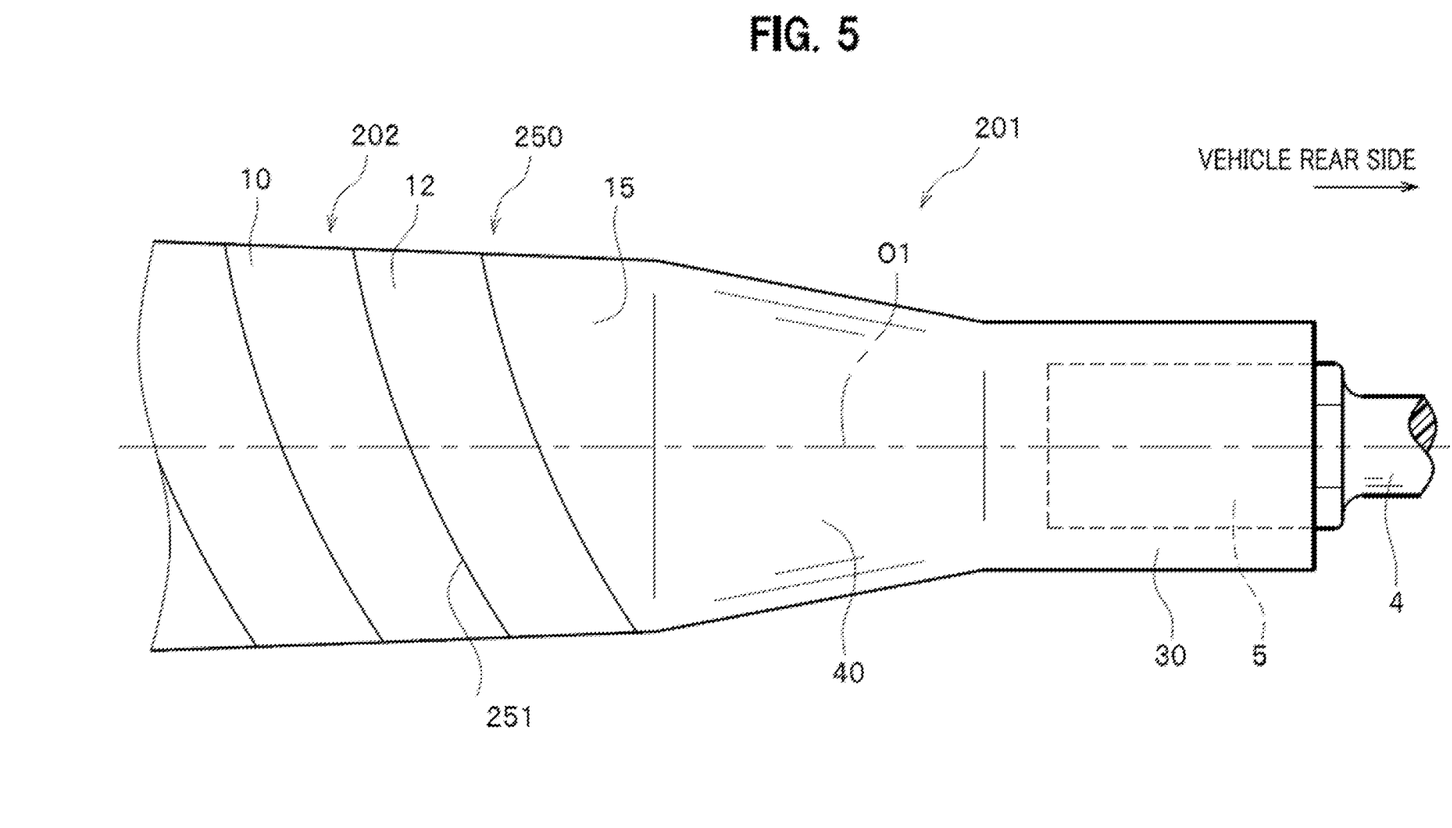
FIG. 5 is a side view illustrating a weak portion in a power transmission shaft of a third embodiment.

As illustrated in FIG. 5, the power transmission shaft 201 of the third embodiment includes the tubular body 202, the stub yoke 3 (see FIG. 1) joined to a front end of the tubular body 202, and the stub shaft 4 joined to a rear end of the tubular body 202.

The tubular body 202 of the third embodiment includes a main body portion 10, the first connection portion 20 (see FIG. 1) arranged in front of the main body portion 10, and the second connection portion 30 arranged behind the main body portion 10. Moreover, a weak portion 250 is formed in the main body portion 10.

A linear rupture portion 251 formed in the weak portion 250 of the third embodiment is a cut line formed in a helical shape in the circumferential direction of the main body portion 10. The rupture portion 251 of the third embodiment is helically curved with the axis O1 being the center axis. Although the rupture portion 251 of the third embodiment is one continuous helical line, in the present invention, the rupture portion 251 may be formed of broken lines arranged at certain intervals. Moreover, the rupture portion 251 may be formed of a helical groove.

In the power transmission shaft 201 including the tubular body 202 of the third embodiment as described above, when the vehicle is hit from the front side and impact load inputted in the axis O1 direction exceeds a predetermined value, the rupture portion 251 is cut open and fails and the weak portion 250 of the main body portion 10 is crushed. The failure of the power transmission shaft 201 in vehicle impact thus allows the engine and the transmission mounted in the front portion of the vehicle body to quickly retreat and the front portion of the vehicle body absorbs impact energy.

As described above, in the tubular body 202 and the power transmission shaft 201 of the third embodiment, the molding of the second connection portion 30 and the main body portion 10 is facilitated as in the power transmission shaft 1 (see FIG. 2) of the first embodiment and, in addition, the linear rupture portion 251 is formed on the outer peripheral surface 15 of the weak portion 250. Accordingly, the tubular body 202 and the power transmission shaft 201 of the third embodiment can achieve cost reduction and weight reduction.

Moreover, in the tubular body 202 and the power transmission shaft 201 of the third embodiment, a load value at which the weak portion 250 fails can be set by adjusting the shape of the weak portion 250. Note that the turning direction of the helical rupture portion 251 is not limited to a certain direction.

Fourth Embodiment

Next, a power transmission shaft 301 including a tubular body 302 according to a fourth embodiment of the present invention is described.

Figure 6:
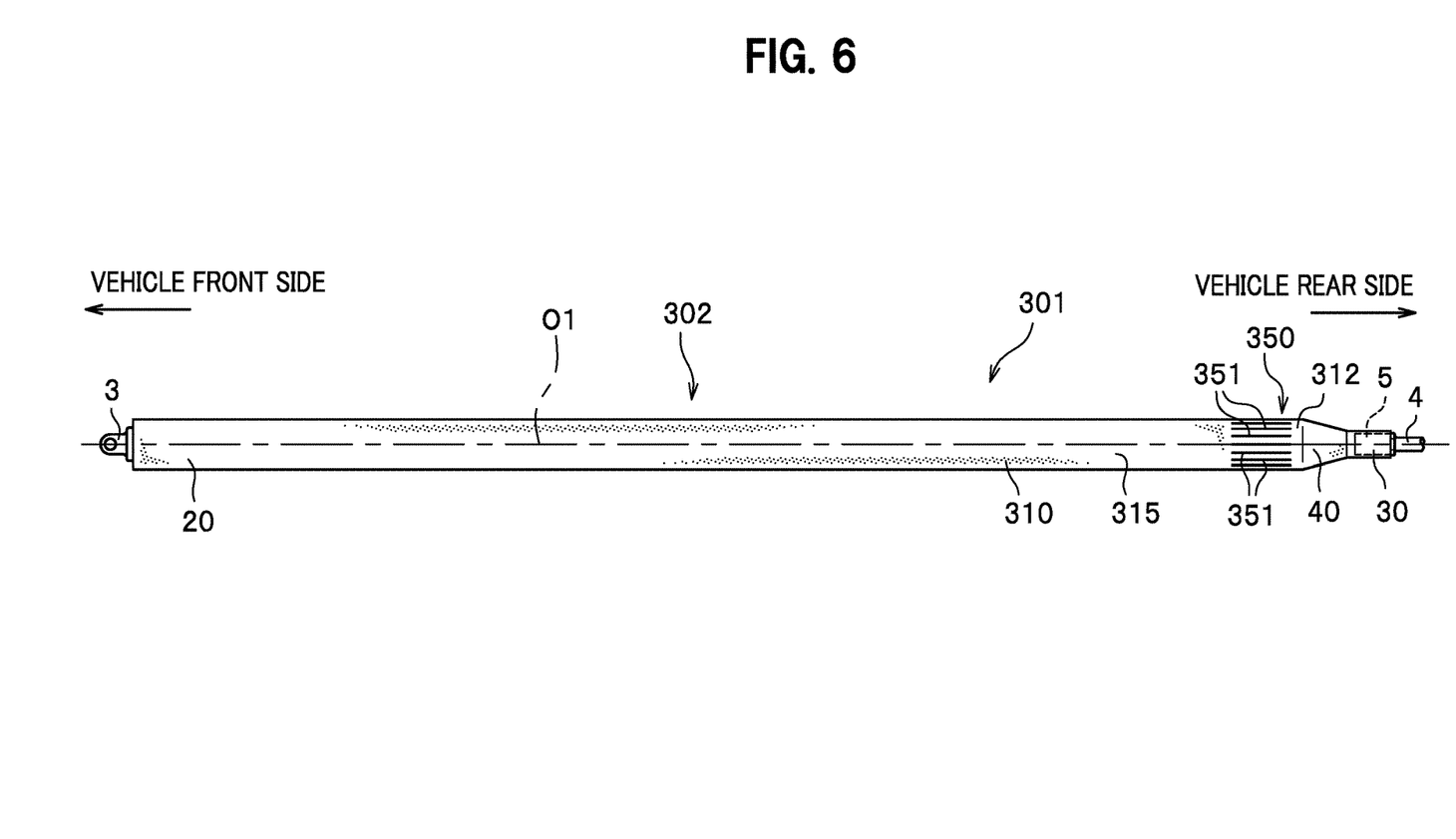
FIG. 6 is a side view illustrating a power transmission shaft of a fourth embodiment.

As illustrated in FIG. 6, the power transmission shaft 301 of the fourth embodiment includes the tubular body 302, the stub yoke 3 (see FIG. 1) joined to a front end of the tubular body 302, and the stub shaft 4 joined to a rear end of the tubular body 302.

The tubular body 302 of the third embodiment includes the main body portion 310, the first connection portion 20 arranged in front of the main body portion 310, and a second connection portion 30 arranged behind the main body portion 310. Moreover, a weak portion 350 is formed in the main body portion 310.

The main body portion 310 of the fourth embodiment has a uniform outer diameter from a front end portion to a rear end portion. Specifically, the outer shape of the main body portion 310 in the fourth embodiment is a straight cylindrical body.

Although the main body portion 310 of the fourth embodiment has a uniform outer diameter from the front end portion to the rear end portion, in the present invention, the main body portion 310 may be formed to decrease in outer diameter while extending from a center portion to one end portion and have a uniform outer diameter from the center portion to the other end portion.

Linear rupture portions 351 formed in the weak portion 350 of the fourth embodiment are cut lines formed by cutting into an outer peripheral surface 315 of a rear portion 312 of the main body portion 310. In the fourth embodiment, multiple rupture portions 351 are formed at intervals in a circumferential direction of the outer peripheral surface 315 of the weak portion 350.

Note that the number, length, width, shape, and arrangement of the rupture portions 351 in the fourth embodiment are not limited to certain number, length, width, shape, and arrangement as in the power transmission shaft 1 (see FIG. 2) of the first embodiment.

In the power transmission shaft 301 including the tubular body 302 of the fourth embodiment as described above, when the vehicle is hit from the front side and impact load inputted in the axis O1 direction exceeds a predetermined value, the rupture portions 351 open in the circumferential direction and fail and the weak portion 350 of the main body portion 310 is crushed. The failure of the power transmission shaft 301 in vehicle impact thus allows the engine and the transmission mounted in the front portion of the vehicle body to quickly retreat and the front portion of the vehicle body absorbs impact energy.

As described above, in the tubular body 302 and the power transmission shaft 301 of the fourth embodiment, the molding of the second connection portion 30 and the main body portion 310 is facilitated as in the power transmission shaft 1 (see FIG. 2) of the first embodiment and, in addition, the linear rupture portions 351 are formed on the outer peripheral surface 315 of the weak portion 350. Accordingly, the tubular body 302 and the power transmission shaft 301 of the fourth embodiment can achieve cost reduction and weight reduction. Moreover, in the tubular body 302 and the power transmission shaft 301 of the fourth embodiment, a load value at which the weak portion 350 fails can be set by adjusting the shape of the linear rupture portions 351.

Although the embodiments are described above, the present invention is not limited to the examples described in the embodiments.

For example, although the weak portion is formed in the rear portion of the main body portion in the power transmission shafts of the embodiments, the weak portion may be formed in a front portion or an intermediate portion of the main body portion.

The invention claimed is:

1. A tubular body used in a power transmission shaft that transmits power by rotating and that is made of a fiber reinforced plastic, comprising:
   a tubular main body portion that is centered at an axis;
   a connection portion which is continuous with an end portion of the main body portion and to which a coupling member is joined; and
   an inclined portion that is formed between the main body portion and the connection portion and that decreases in diameter while extending from the main body portion toward the connection portion, wherein
   a linear rupture portion that fails when load inputted in an axial direction exceeds a predetermined value is formed only on an outer peripheral surface of an end portion of the main body portion on the inclined portion side,
   the rupture portion is a cut line or a groove extending in the axial direction of the main body portion, and
   the cut line or the groove does not penetrate through the main body in a thickness direction of the main body.

2. The tubular body used in the power transmission shaft according to claim 1, wherein the fiber reinforced plastic is a carbon fiber reinforced plastic.

3. The tubular body used in the power transmission shaft according to claim 1, wherein a plurality of the rupture portions are formed at intervals in a circumferential direction of the main body portion.

4. The tubular body used in the power transmission shaft according to claim 1, wherein the rupture portion is formed in a helical shape in a circumferential direction of the main body portion.

5. The tubular body used in the power transmission shaft according to claim 1, wherein
   the main body portion decreases in outer diameter while extending from a center portion toward both end portions, and
   an outer peripheral surface of the main body portion is formed in an arc shape in the axial direction from one to the other of both end portions.

6. The tubular body used in the power transmission shaft according to claim 1, wherein the main body portion has an uniform outer diameter from one end portion to another end portion.

7. A power transmission shaft comprising:
   the tubular body used in the power transmission shaft according to claim 1; and
   the coupling member joined to the connection portion.

* * * * *